United States Patent
Nishida et al.

(10) Patent No.: US 6,615,159 B1
(45) Date of Patent: Sep. 2, 2003

(54) METHOD AND SYSTEM FOR SUPPORTING MAINTENANCE FOR A MOLDING SYSTEM

(75) Inventors: Tadashi Nishida, Omiya Shinshiro (JP); Minoru Kondo, Toyokawa (JP); Kazuya Nishikore, Toyokawa (JP); Masataka Shiraki, Toyokawa (JP)

(73) Assignee: Sintokogio, Ltd., Aichi Prefecture (JP)

( * ) Notice: Subject to any disclaimer, the term of this patent is extended or adjusted under 35 U.S.C. 154(b) by 0 days.

(21) Appl. No.: 09/518,406

(22) Filed: Mar. 3, 2000

(30) Foreign Application Priority Data

Mar. 3, 1999 (JP) .......................................... 11-055799

(51) Int. Cl.[7] .............................................. G21C 17/00
(52) U.S. Cl. ........................ 702/184; 702/183; 702/185; 700/117; 65/29.11
(58) Field of Search .............................. 702/184, 183, 702/185; 700/117, 118, 157, 197, 204; 264/40.1, 238, 349; 65/29.11, 29.1

(56) References Cited

U.S. PATENT DOCUMENTS 4,142,238 A * 2/1979 Brandt et al. ............... 364/552
4,583,280 A * 4/1986 Corrigan et al. .............. 29/563

FOREIGN PATENT DOCUMENTS

JP 6-315763 11/1994

\* cited by examiner

*Primary Examiner*—John Barlow
*Assistant Examiner*—Stephen J. Cherry
(74) *Attorney, Agent, or Firm*—Gray Cary Ware & Freidenrich LLP

(57) ABSTRACT

A method and system is provided to determine or estimate components that may have to be maintained before a molding system that has those components is caused to be stopped by problems with those components. Cycle times that each correspond to the time of the cycle of each operation of the molding system and operation times of the steps performed by the components, which operation times affect the cycle times, are measured and stored. Based on the sum of the operation times that exceed a predetermined time or the sum of the number of operation times that exceed the predetermined time, any step that may cause a problem among the steps of the components, which affect the cycle time, is determined.

6 Claims, 16 Drawing Sheets

Displaying a Pareto diagram of excessive periods of time during specific periods

METHOD AND SYSTEM FOR SUPPORTING MAINTENANCE FOR A MOLDING SYSTEM

FIELD OF INVENTION

This invention relates to a method and system for supporting maintenance for a molding system. Particularly, it relates to a method and system for determining or anticipating which apparatus of a molding system may cause a problem, before the problem arises in the system.

DESCRIPTION OF THE RELATED ART

A molding system uses many components, such as an air cylinder and an oil cylinder. They may exceed 200–300 counts. Because a molding system uses many components and silica sand, and because motes float around the system, the components of the apparatuses tend to be abraded so that those components or apparatuses may be disturbed. Also, because each apparatus operates in two steps, and because those steps are sensed when they are terminated, the degradation of the sensors affects the cycle time of the molding system, which cycle time corresponds to the time of a cycle of one operation of the molding system. Also, the timing of the steps may vary, so that the steps can be unstable.

When the molding system is caused to be stopped by a problem, what apparatus or component is disturbed can be determined by accessing data that is stored in the memory of the controller of the molding system and by inspecting peripheral components of the unit. As a result, the determination and inspection take a long time, and may impede production plans, such as the production and production dates.

In addition, over time, grease for components for a molding system becomes insufficient, or parts, a sealant, etc. of the components degrade, so that the system cannot accurately work or the time to operate the system becomes long. Thus, usually, the system is periodically maintained. However, it is difficult to determine to what degree it will degrade. Thus, when components have problems, the system is stopped and then parts, a sealant, elements etc. of the components are exchanged.

There are some methods to monitor the tendency for each component to degrade. One of the methods uses a vibration sensor that is located on the component to monitor the amplitude and the acceleration of vibrations.

Another method is used to monitor grease on a bearing, etc. Many components are needed to perform those methods, so that the system becomes a massive one. As a sensor is apt to degrade, a special apparatus is used for a sensor. However, the special apparatus cannot be used to monitor the tendency for all the apparatuses or components of the system to degrade. Thus, there is a desire to easily monitor the tendency of all the apparatuses or components to degrade, so that their problems can be anticipated before the system is caused to be stopped.

SUMMARY OF THE INVENTION

Thus, this invention is to provide a system and a method for determining or anticipating which apparatus must be repaired before a molding system is caused to be stopped by any problem.

One object is to provide a method for supporting maintenance for a molding system and for determining or anticipating which apparatus must be maintained before a molding system is caused to be interrupted by the problem. The method includes the steps of measuring and storing at short periods data on cycle times that correspond to the time for the cycle of each operation of the molding system and the operation times of the steps performed by the apparatuses, the operation times affecting the cycle time, retrieving data on and specifying any cycle time that is longer than a normal cycle time from a database in which the cycle times and the operation times are stored, and determining which step may cause a problem among the steps of the apparatuses, and which steps affect the cycle time, based on the sum of the operation times for the cycle times specified that exceed a predetermined time or the sum of the number of operation times that exceed the predetermined time.

Also, one object is to provide a method for supporting maintenance for a molding system and for determining which apparatus must be maintained before a molding system is caused to be interrupted by a problem. The method includes the steps of measuring and storing data at short periods on cycle times that each correspond to the time for the cycle of each operation of the molding system and the operation times of the steps performed by the apparatuses, the operation times affecting the cycle time, retrieving data on and specifying any cycle time that is longer than a normal cycle time from a database in which the cycle times and the operation times are stored, determining which step may cause a problem among the steps of the apparatuses, which steps affect the cycle time, based on the sum of the operation times for the cycle times specified that exceed a predetermined time or the sum of the number of operation times that exceed the predetermined time, and monitoring the cycle times to see the changes between the operation times of the step determined.

Further, an object is to provide a method for supporting maintenance for a molding system and for anticipating which apparatus must be maintained before a molding system is caused to be interrupted by the problem. The method includes the steps of measuring and storing at short periods data on cycle times, each corresponding to the time for a cycle of each operation of the molding system, and operation times of the steps performed by the apparatuses, the operation times affecting the cylce time, retrieving and specifying data on any cycle time that is longer than a normal cycle time from a database in which the cycle times and the operation times are stored, determining any step that may cause a problem among the steps of the apparatuses, which steps affect the cycle time, based on the sum of the operation times for the cycle times specified that exceed a predetermined time or the sum of the number of operation times that exceed the predetermined time, and monitoring transitions of the operation times of the step determined.

It is still another object to provide a maintenance system for a molding system and for determining or anticipating which apparatus must be maintained before the molding system is interrupted by the problem. The system comprises a memory part for measuring and storing at short periods data on cycle times that each correspond to the time of the cycle of each operation of the molding system and the operation times of the steps performed by the apparatuses, the operation times affecting the cycle time, a retrieving part for retrieving data on and specifying any cycle time that is longer than a normal cycle time from a database in which the cycle times and the operation times are stored by the memory part, and a determining part for determining any step that may cause a problem among the steps of the apparatuses, which affect the cycle time, based on the sum of the operation times for each cycle time specified that exceed a predetermined time or the sum of the number of operation times that exceed the predetermined time.

One object is to provide a maintenance system for a molding system and for determining which apparatus must be maintained before the molding system is interrupted by any problem in the apparatus. The system comprises a memory part for measuring and storing at short periods data on cycle times that each correspond to the time of the cycle of each operation of the molding system and the operation times of the steps performed by the apparatuses, the operation times affecting the cycle time, a retrieving part for specifying a cycle time that is longer than a normal cycle time from a database in which the cycle times and the operation times are stored by the memory part, and a monitoring part for checking changes in the cycle times for the operation times of the step that is determined may cause a problem among the steps of the apparatuses, which steps affect the cycle time, based on the sum of the operation times for each cycle time specified by the retrieving part that exceed a predetermined time or the sum of the number of operation times that exceed the predetermined time.

Also, one object is to provide a maintenance system for a molding system and for anticipating which apparatus must be maintained before the molding system is caused to be interrupted by the apparatus, comprising the memory part for measuring and storing at short periods data on cycle times that each correspond to the time of a cycle of each operation of the molding system and the operation times of the steps performed by the apparatuses, the operation times affecting the cycle time, a retrieving part for specifying a cycle time that is longer than a normal cycle time from a database in which the cycle times and the operation times are stored by the memory part, a part for determining any step that may cause a problem among the steps of the apparatuses, which steps affect the cycle time, based on the sum of the operation times for each cycle time specified by the retrieving part that exceed a predetermined time or the sum of the number of operation times that exceed the predetermined time, and a monitoring part for checking the transitions of the operation times of the step that are determined by the determination part.

DETAILED DESCRIPTION OF THE PREFERRED EMBODIMENT

Figure 1:
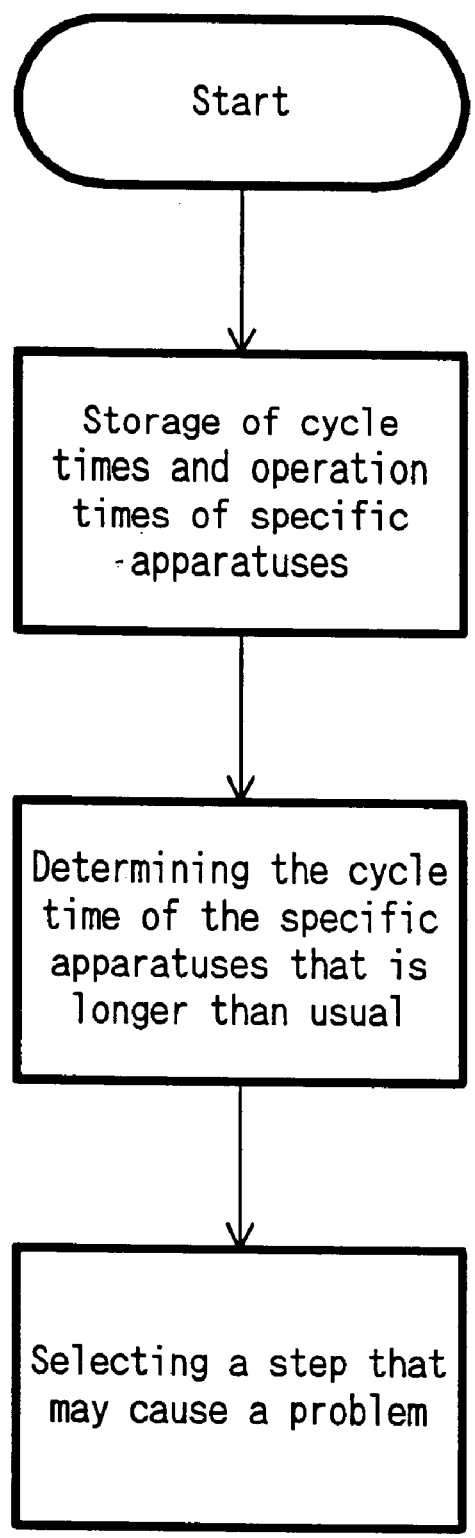
FIG. 1 is a flowchart of the steps of one embodiment of this invention.

Based on FIG. 1, one embodiment of the method of this invention for supporting maintenance for a molding system and for determining or anticipating which apparatus must be maintained before a molding system is caused to be interrupted by the problem is explained. First, at short periods, data on cycle times that correspond to the time for the cycle of each operation of the molding system and the operation times of the steps performed by the apparatuses is stored. The operation times affect the cycle time. Then, a step is done to determine any cycle times that is longer than a normal cycle time from a database in which the cycle times and the operation times are stored. Then, a step is carried out to select which step may cause a problem among the steps of the apparatuses, based on the sum of the operation times for the cycle times specified that exceed a predetermined time or the sum of the number of operation times that exceed the predetermined time.

Figure 2:
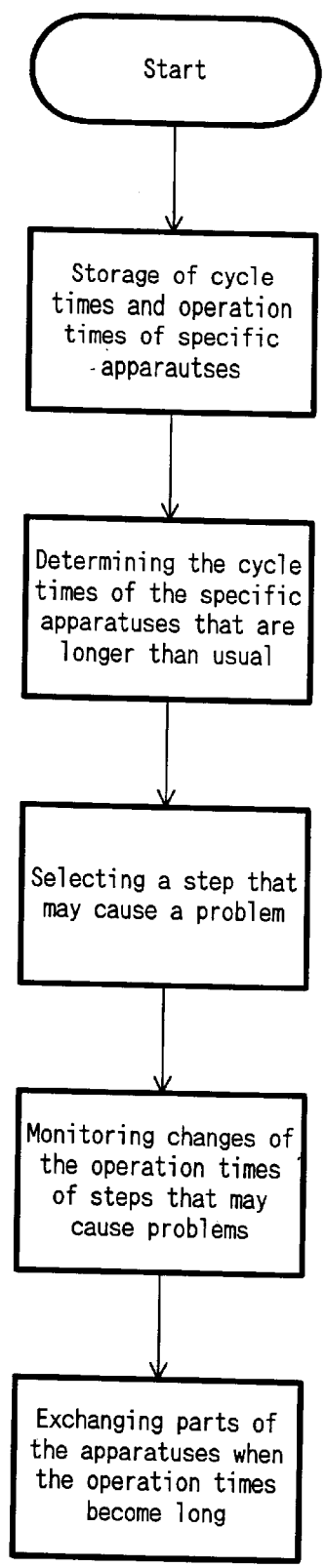
FIG. 2 is a flowchart of the steps of another embodiment of this invention.

Based on FIG. 2, one embodiment of the method of this invention for supporting maintenance for a molding system and for determining which apparatus must be maintained before a molding system is caused to be interrupted by a problem is explained. First, a short periods, data on cycle times that each correspond to the time for the cycle of each operation of the molding system and the operation times of the steps performed by the apparatuses is stored. The operation times affect the cycle time. Then, any cycle time that is longer than a normal cycle time from a database in which the cycle times and the operation times are stored is determined. Then, a step is carried out to select which step may cause a problem among the steps of the apparatuses, based on the sum of the operation times for the cycle times specified that exceed a predetermined time or the sum of the number of operation times that exceed the predetermined time. Then, the changes are monitored between the operation times of the step determined. When the operation times become long, the parts of the apparatuses are exchanged.

Figure 3:
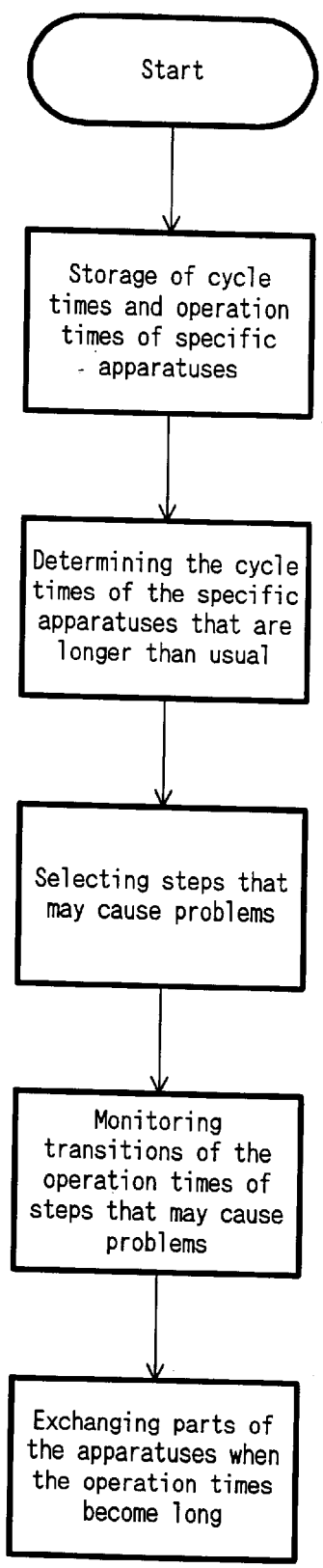
FIG. 3 is a flowchart of the steps of another embodiment of this invention.

Based on FIG. 3, one embodiment of the method of this invention for supporting maintenance for a molding system and for anticipating which apparatus must be maintained before a molding system is caused to be interrupted by the problem is explained. First, at short periods, data on cycle times, each corresponding to the time for a cycle of each operation of the molding system, and operation times of the steps performed by the apparatuses is stored. The operation times affect the cycle time. Then, data on any cycle time that is longer than a normal cycle time from a database in which the cycle times and the operation times are stored is determined. Then, any step that may cause a problem among the steps of the apparatuses is selected, based on the sum of the operation times for the cycle times specified that exceed a predetermined time or the sum of the number of operation times that exceed the predetermined time. Then, the transitions of the operation times of the step determined are monitored. When the operation times become long, the parts of the apparatuses are exchanged.

Figure 4:
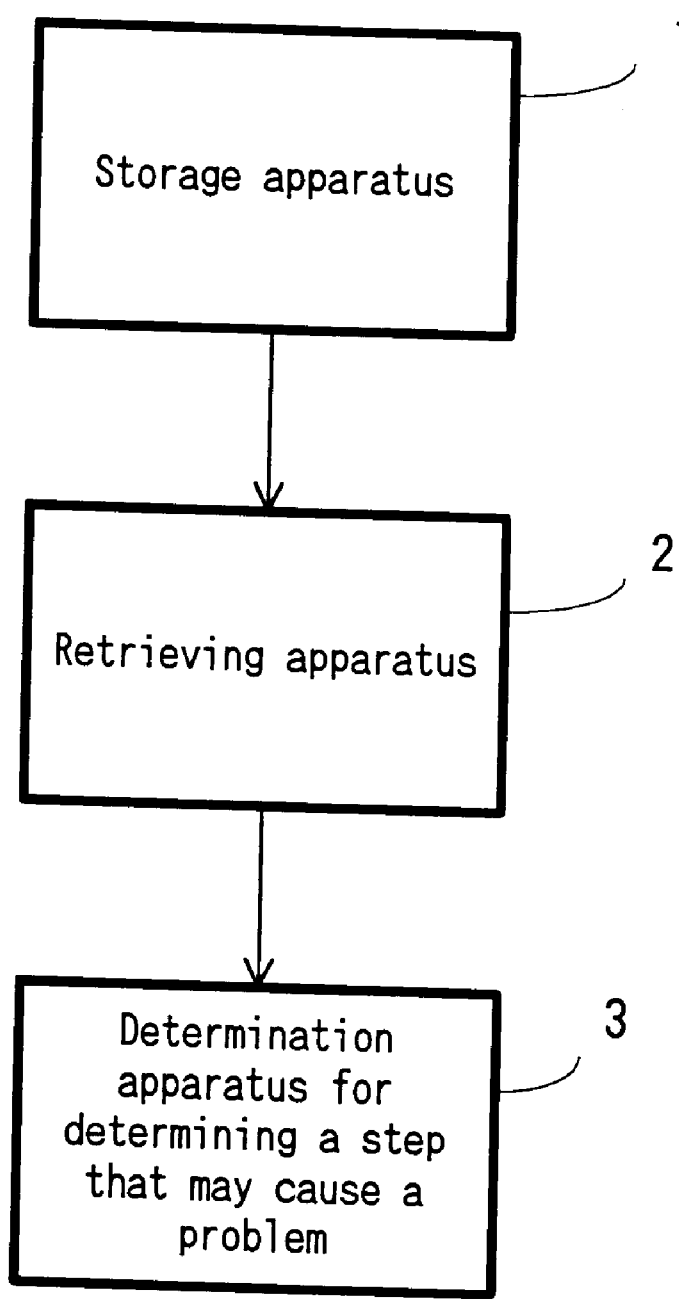
FIG. 4 is a block diagram of one of the system of this invention.

Based on FIG. 4, one embodiment of the maintenance system of this invention for a molding system and for determining or anticipating which apparatus must be maintained before the molding system is interrupted by the problem is explained. The system comprises a memory part or storage apparatus 1 for measuring and storing at short periods data on cycle times that each correspond to the time of the cycle of each operation of the molding system and the operation times of the steps performed by the apparatuses. The operation times affect the cycle time. A retrieving apparatus 2 retrieves data on any cycle time that is longer than a normal cycle time from a database in which the cycle times and the operation times are stored by the memory part. A determination apparatus 3 determines any step that may cause a problem among the steps of the apparatuses, which affect the cycle time, based on the sum of the operation times for each cycle time specified that exceed a predetermined time or the sum of the number of operation times that exceed the predetermined time.

Figure 5:
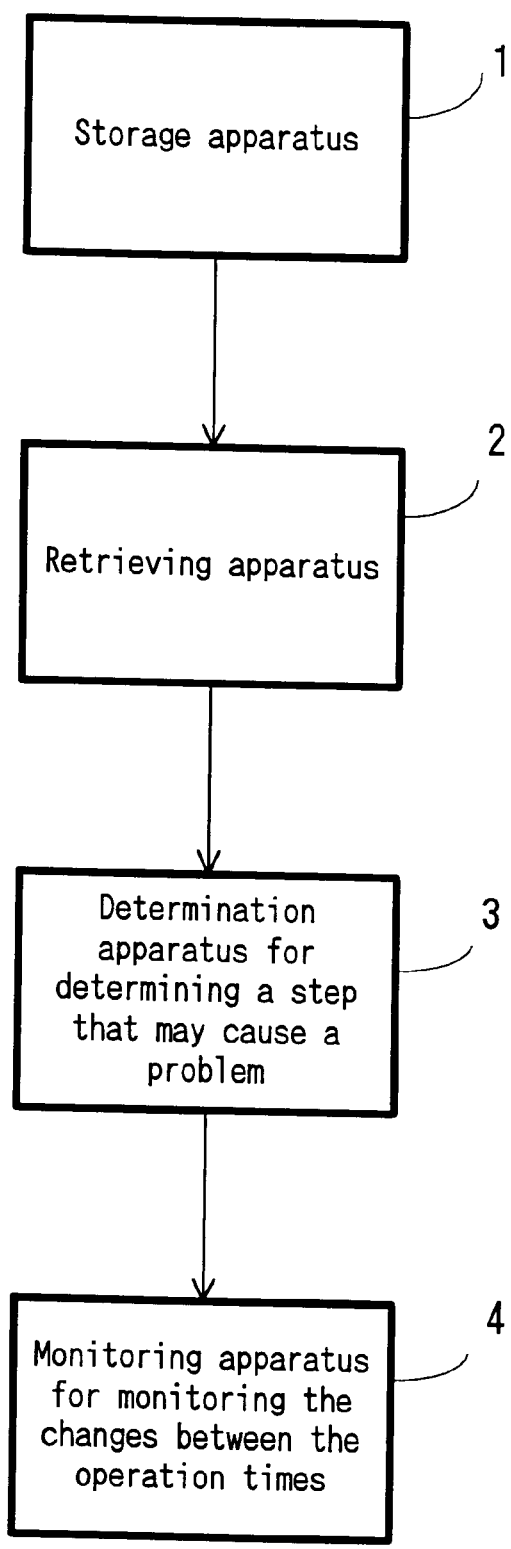
FIG. 5 is a block diagram of another system of this invention.

Based on FIG. 5, one embodiment of the maintenance system of this invention for a molding system and for determining which apparatus must be maintained before the molding system is interrupted by any problem in the apparatus is explained. The system comprises a memory part or a storage apparatus 1 for measuring and storing at short periods data on cycle times that each correspond to the time of the cycle of each operation of the molding system and the operation times of the steps performed by the apparatuses. The operation times affect the cycle time. A retrieving apparatus 2 retrieves a cycle time that is longer than a normal cycle time from a database in which the cycle times and the operation times are stored by the memory part. A determination apparatus 3 determines any step that that may cause a problem. Then, a monitoring apparatus 4 monitors changes between the operation times of the step that is determined may cause a problem among the steps of the apparatuses, which steps affect the cycle time, based on the sum of the operation times for each cycle time specified by the retrieving part that exceed a predetermined time or the sum of the number of operation times that exceed the predetermined time.

Figure 6:
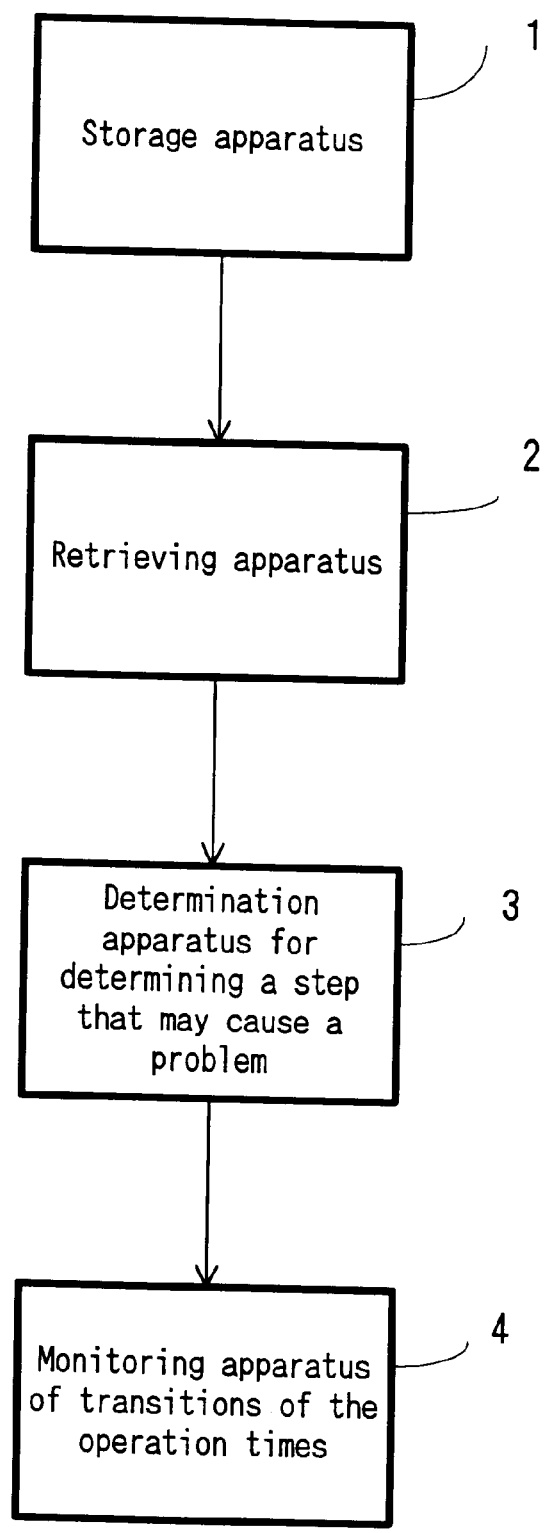
FIG. 6 is a block diagram of another system of this invention.

Based on FIG. 6, one embodiment of the maintenance system of the invention for a molding system and for anticipating which apparatus must be maintained before the molding system is caused to be interrupted by the apparatus is explained. The maintenance system comprises a storage apparatus 1 for measuring and storing at short periods data on cycle times that each correspond to the time of a cycle of each operation of the molding system and the operation times of the steps performed by the apparatuses. The operation times affecting the cycle time. A retrieving apparatus 2 retrieves data on any cycle times that is longer than a normal cycle time from a database in which the cycle times and the operation times are stored by the memory part. A determination apparatus 3 determines any step that may cause a problem among the steps of the apparatuses, which steps affect the cycle time, based on the sum of the operation times for each cycle time specified by the retrieving part that exceed a predetermined time or the sum of the number of operation times the exceed the predetermined time. Then, a monitoring apparatus 4 monitors the transitions of the operation times of the step that are determined by the determination part.

Figure 7:
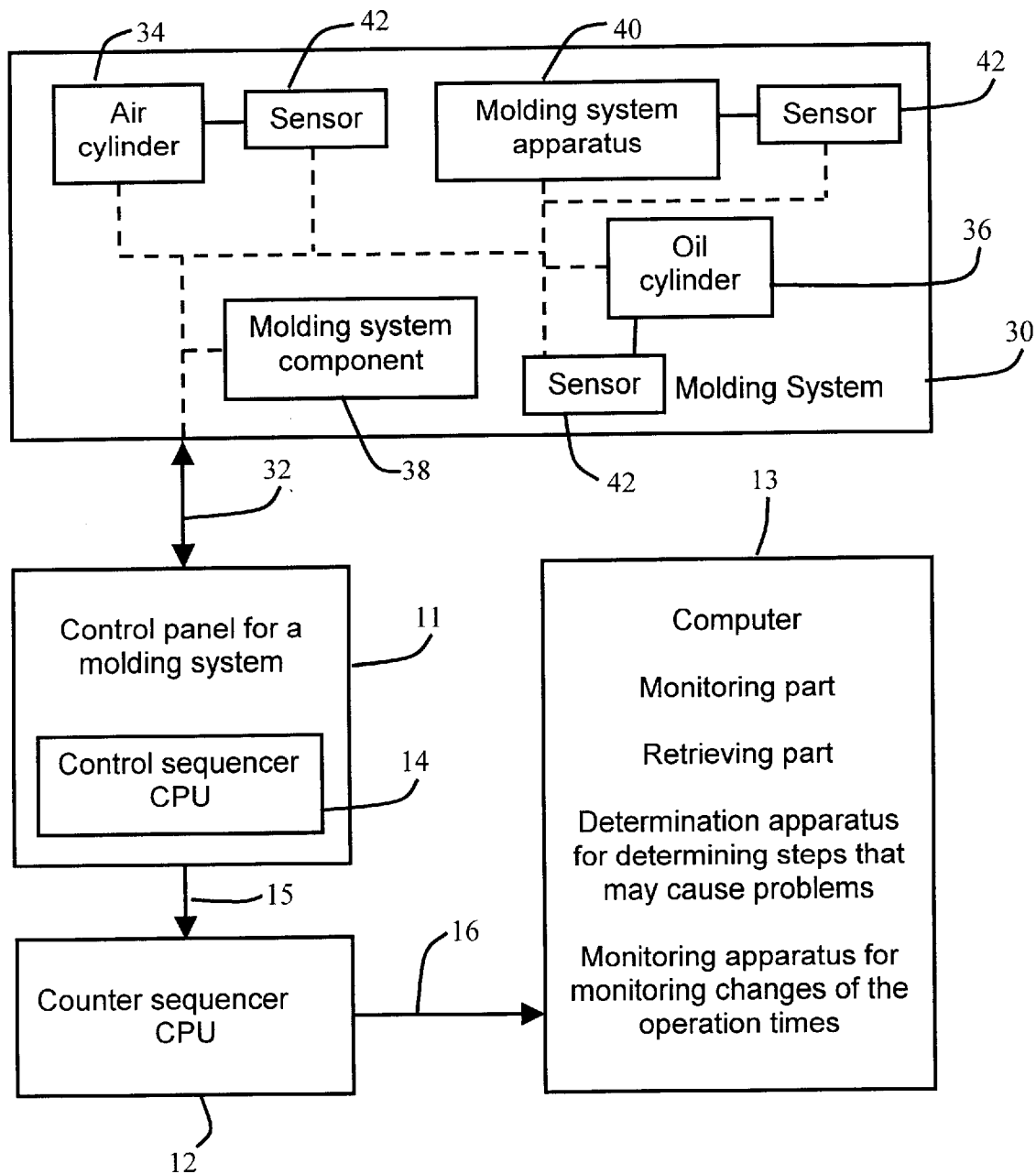
FIG. 7 is a control system of one embodiment of the invention.
Figure 8:
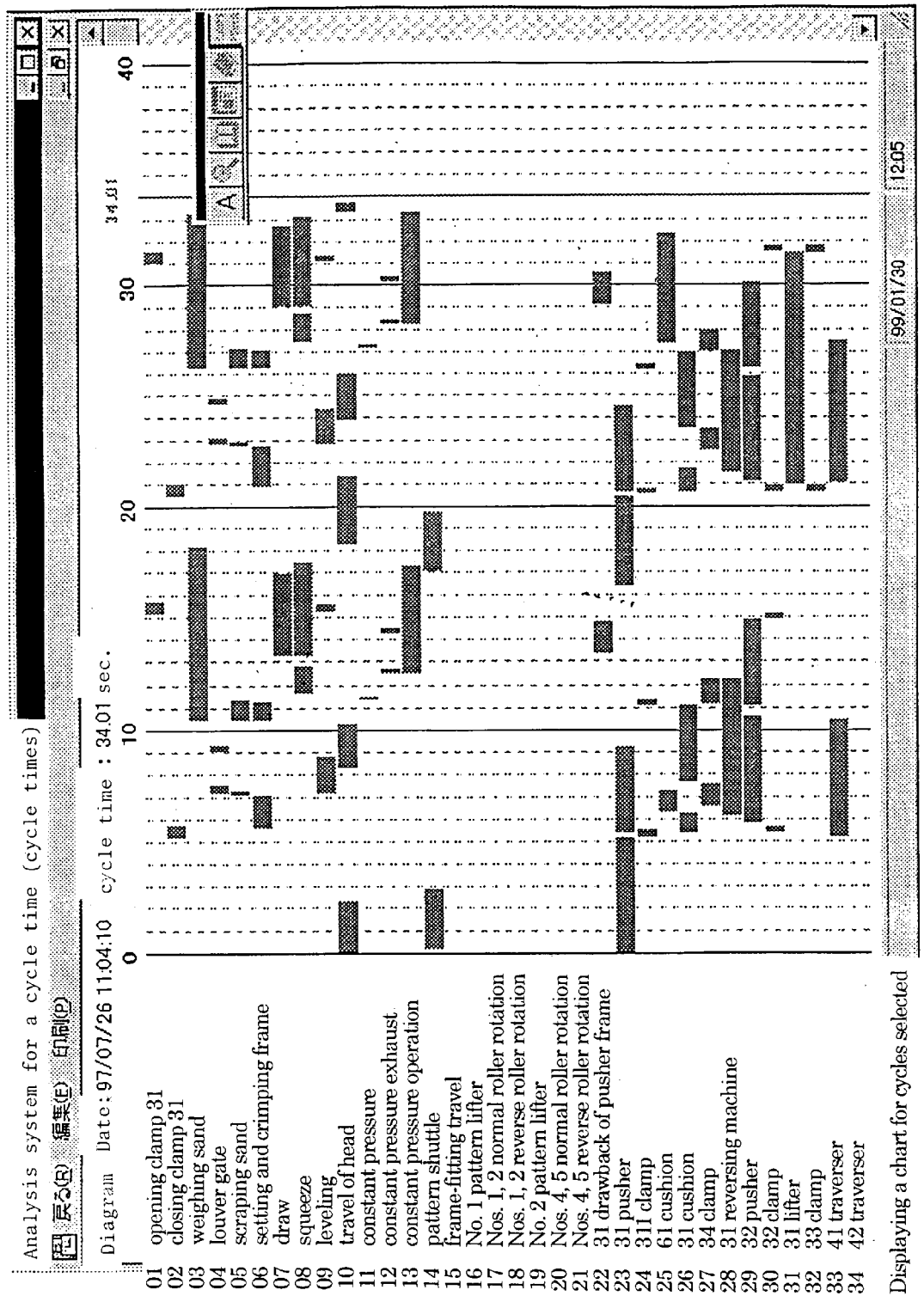
FIG. 8 is a diagram representing a cycle time and an operation time for each step that is included in a database stored in the first embodiment.
Figure 9:
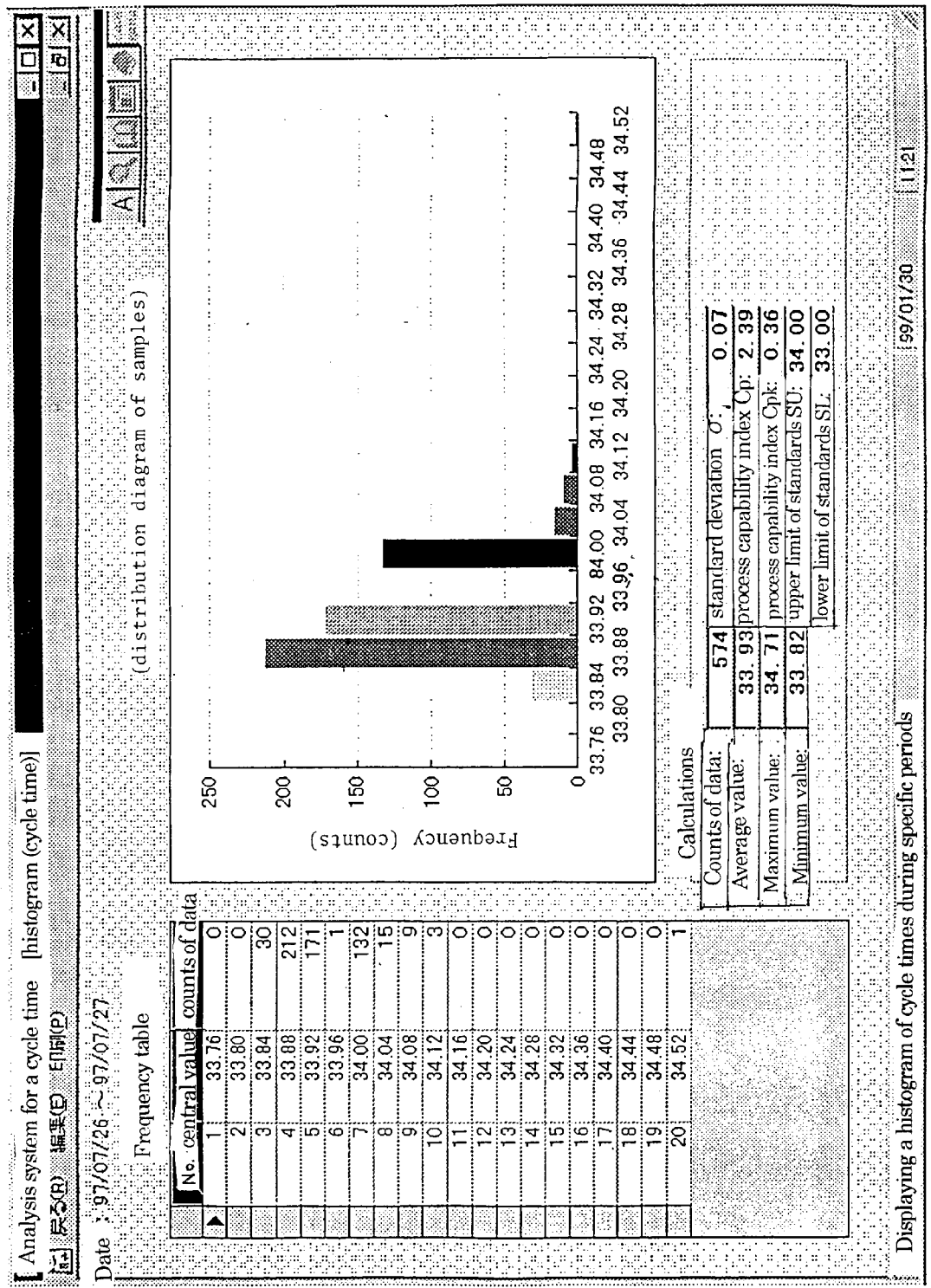
FIG. 9 is a diagram representing frequencies and distributions of the cycle times that are calculated by the first embodiment.
Figure 10:
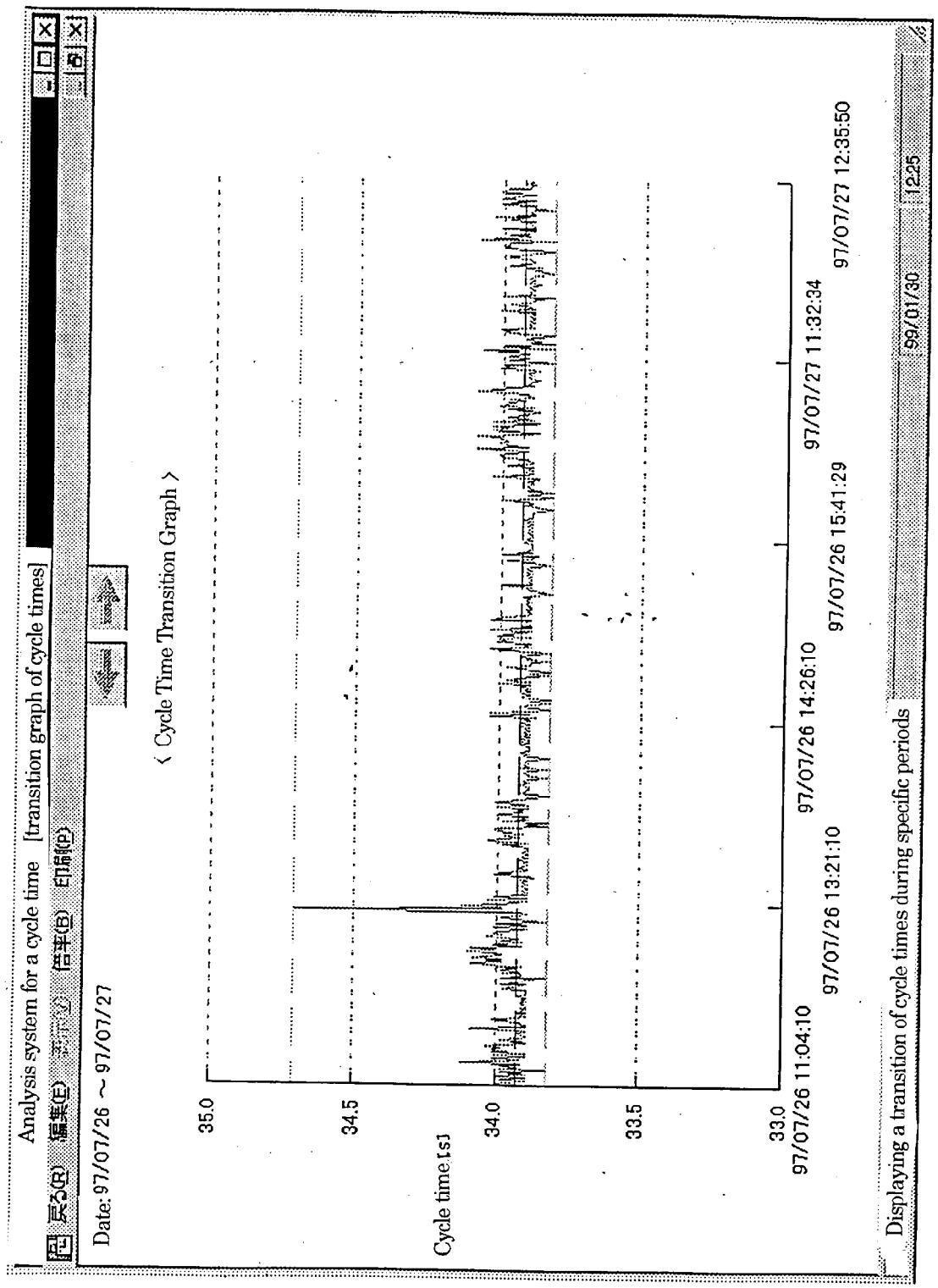
FIG. 10 is a diagram representing the transitions of the cycle times that are generated by the first embodiment.

Based on FIGS. 7–16, one of the embodiments of this invention is now explained. As in FIG. 7, a control system of a molding system of this invention comprises a control panel 11, a CPU 12 for a counter sequencer, and a computer 13. The control panel 11 has a CPU 14 for a control sequencer. The CPU 14 is electrically connected to the CPU 12 through a line 15, which is of the type suitable for carrying signals from the CPU 14 to CPU 12, which can include outputs from sensors, and signals which represent operations of the apparatuses or components of the molding system 30. As shown in FIG. 7, the molding system can include air cylinders 34, oil cylinders 36, and other molding system components 38 and apparatuses 40, and sensors 42 which monitor such components and apparatuses. The CPU 12 is also electrically connected to the computer 13 through a communication line 16. The control panel 11 generates control signals and sends them to the apparatuses of the molding system 30 via communication line 32 to control the entire system.

The CPU 12 of the counter sequencer receives signals from the CPU 14 of the control panel 11. Those signals include those that represent operations of the apparatuses or that are output from sensors, etc. Based on those signals the CPU 12 calculates the actual cycle time and the operation time during each step for each apparatus, and then stores them.

The computer 13 reads out from the CPU 12 the actual cycle times and operation times for each apparatus at intervals of 0.01 second, and then makes a database as actual data on the operation times for the steps. The computer 13 previously stored data on a predetermined operation time during each step for each apparatus, and made the database on the predetermined operation time. Thus, the computer 13 functions as a problem-resolving component that includes a memory component 1, a searching or retrieving component 2, a determination part 3, and a checking or monitoring component 4 for monitoring changes of operation times (FIG. 7).

Below, a procedure is explained in which the control system determines which component or elements will be soon repaired, as described above. First, both the cycle time that corresponds to the time of one cycle of the operation of the entire system and the operation time of each step of the specific component that will affect the cycle time are measured at short intervals, and then stored by the computer 13, which functions as a storage part 1. The data is stored for a long time, as in FIG. 8.

Then, from the database on the cycle time and the operation time for each step the computer 13, which functions as a retrieving part 2, retrieves and determines periods that cause the cycle time to be long. As in FIG. 9, the computer 13 can generate a frequency table and histogram that represent relationships between those cycle times that have different values and the numbers of the cycle times for respective values. As in FIG. 10, the computer 13 also generates a graph of a transition of the cycle times. The graph represents the relationship between the cycle times that have different values and the dates and times. From the frequency table and histogram and the graph that represents the transitions of the cycle times, the periods that cause the cycle times to be long can be retrieved.

Then, based on the sum of the operation times that exceed a predetermined time during a specific period or based on the sum of the numbers of the excessive times of the operation times from a predetermined time, the computer 13, which acts as a determination part 3, determines which steps may have problems, among the steps of the components that can affect the cycle times.

Figure 11:
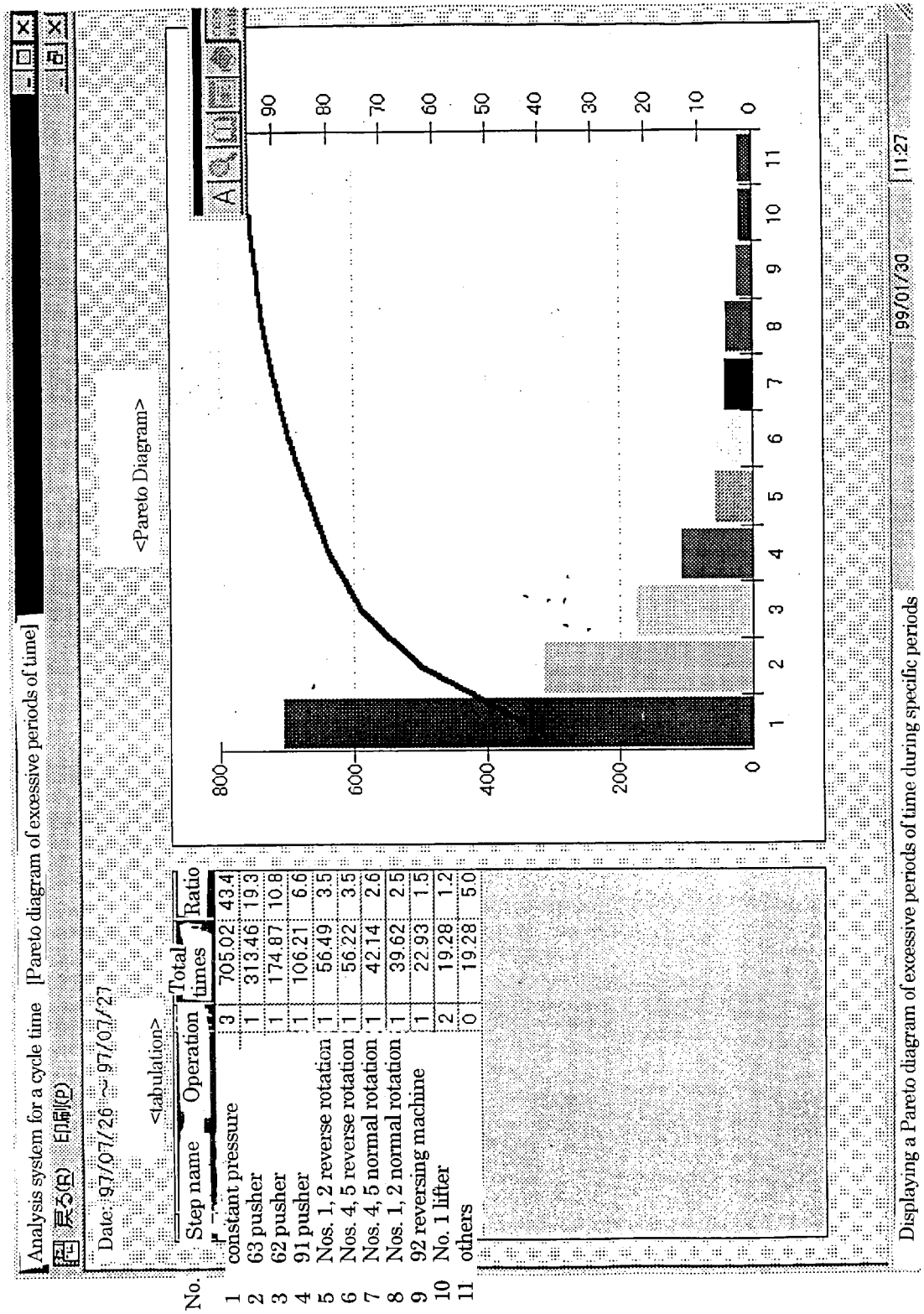
FIG. 11 is a part of a Pareto diagram representing excessive periods of times that are calculated by the first embodiment.
Figure 12:
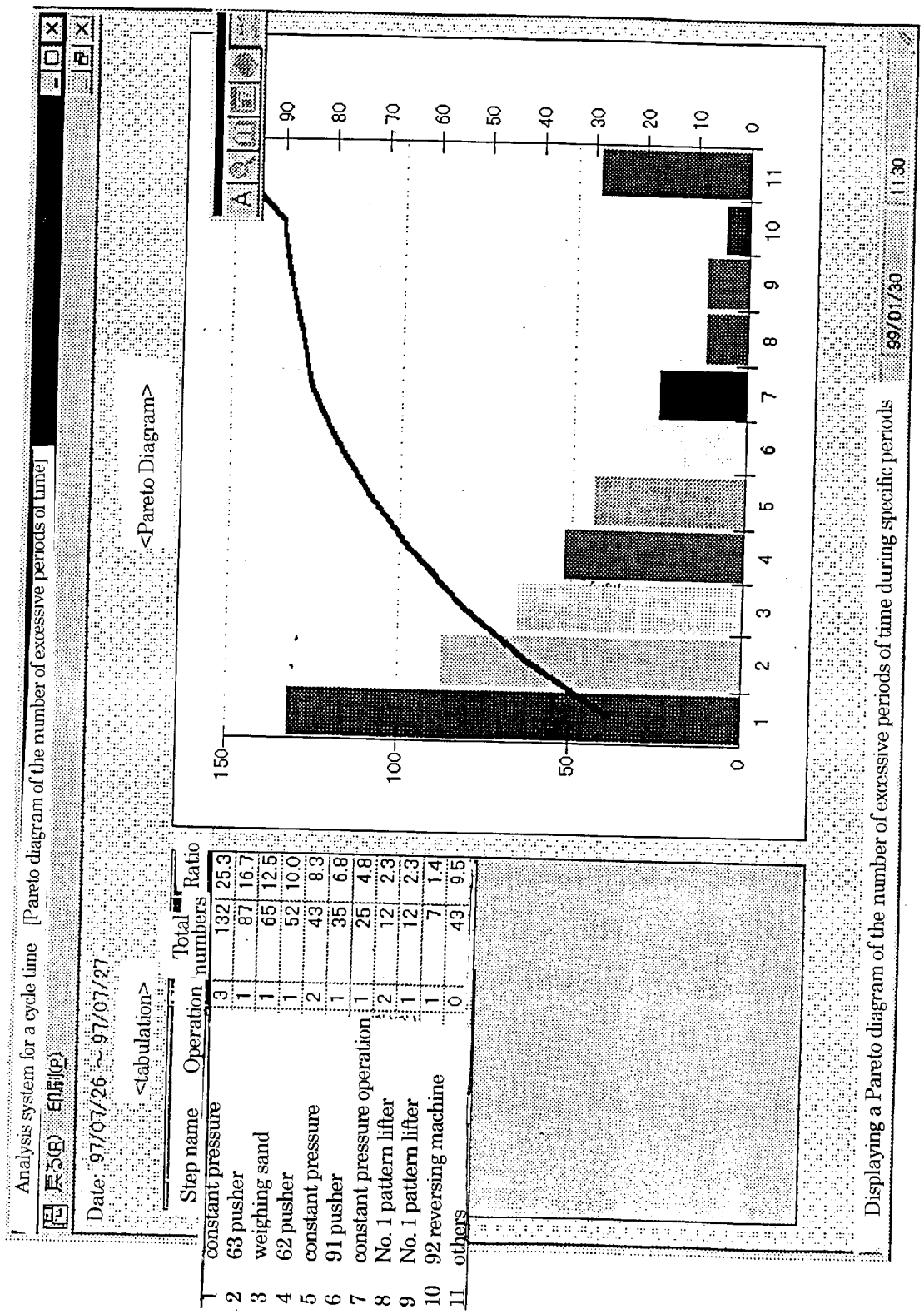
FIG. 12 is a part of a Pareto diagram representing the number of excessive periods of times that are calculated by the first embodiment.
Figure 13:
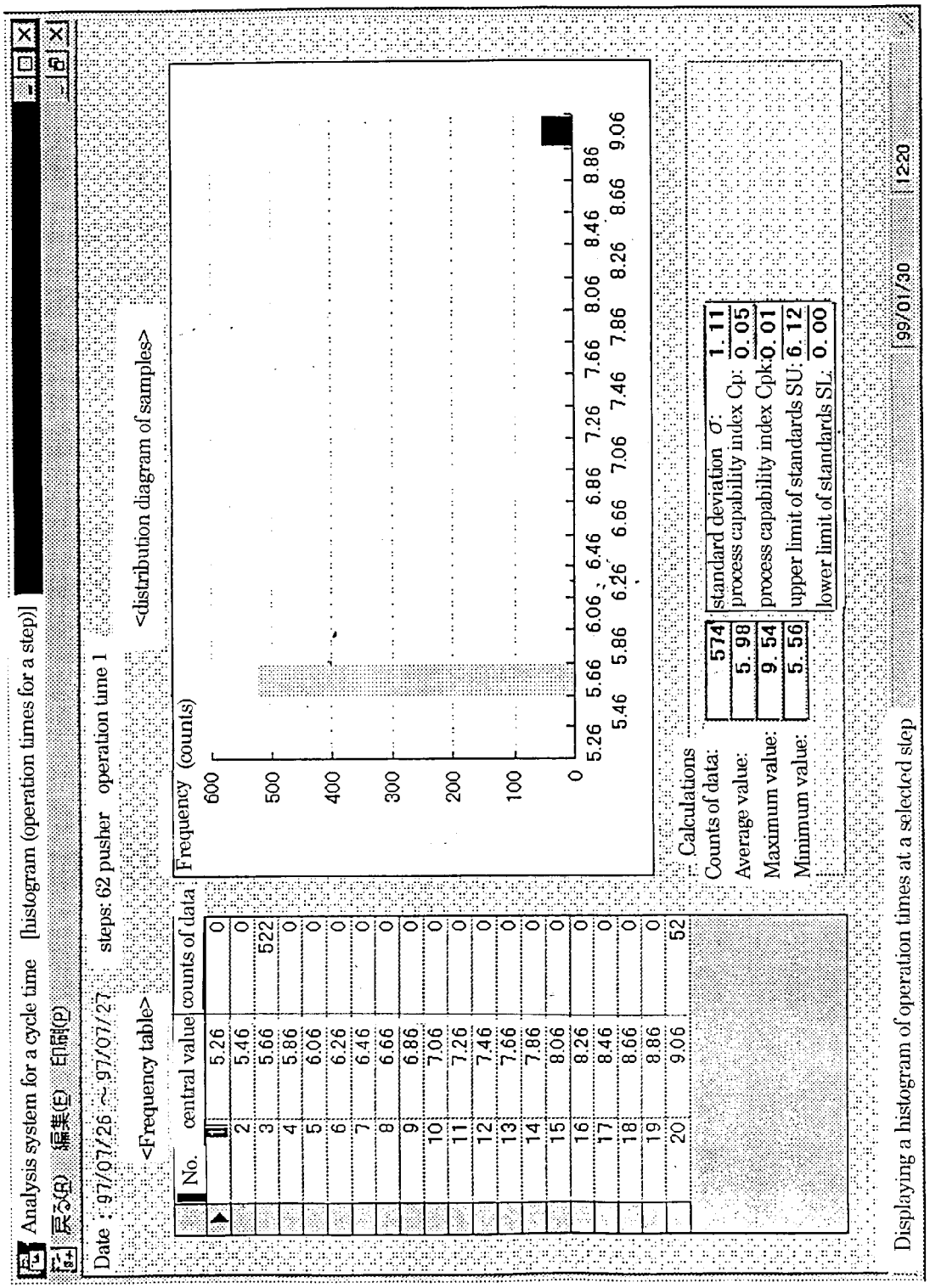
FIG. 13 is a part of a diagram representing the frequencies and distributions of the operation times that are calculated by the first embodiment.
Figure 14:
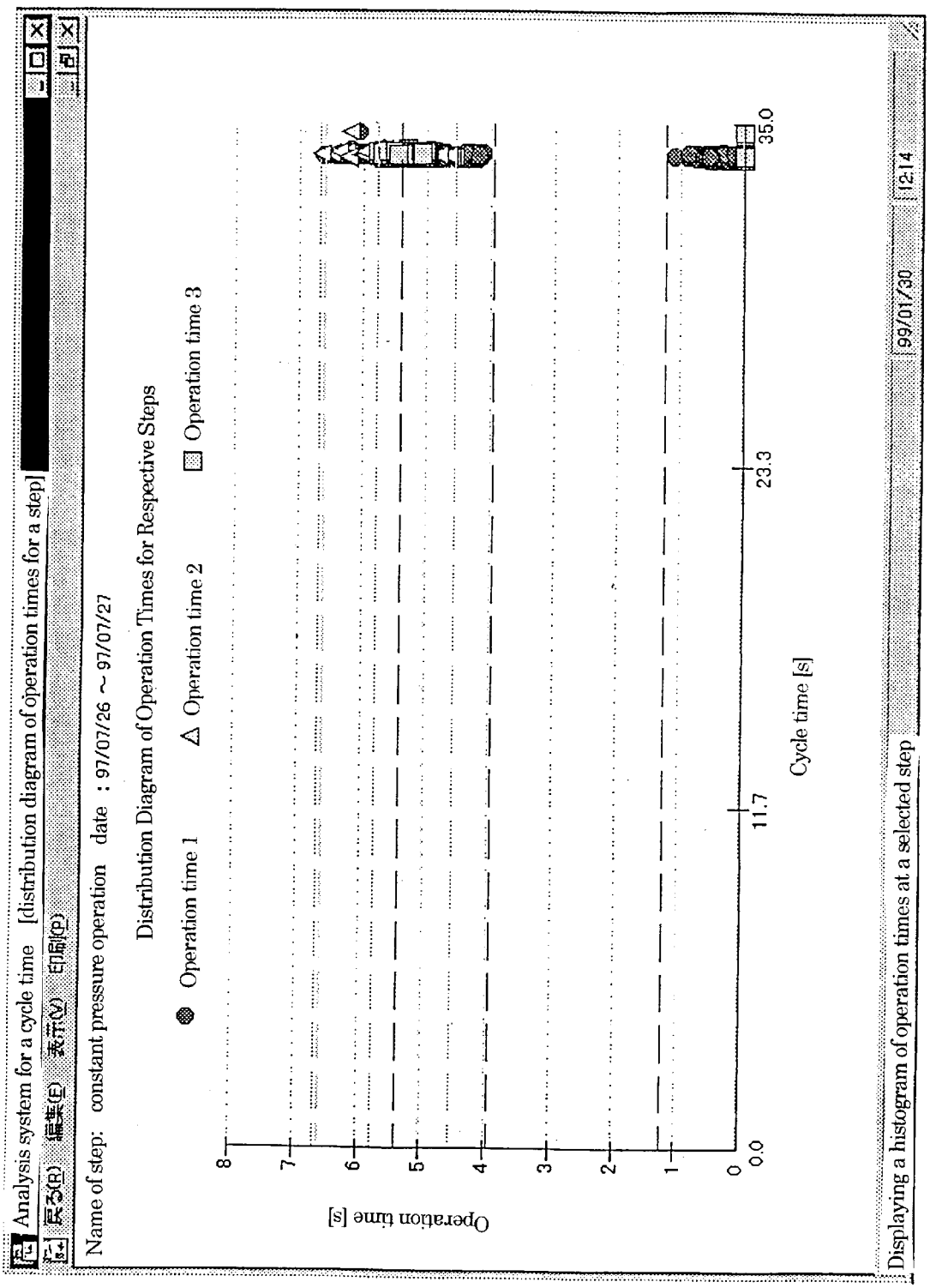
FIG. 14 is a part of a diagram representing the distributions of the operation times that are calculated by the first embodiment.
Figure 15:
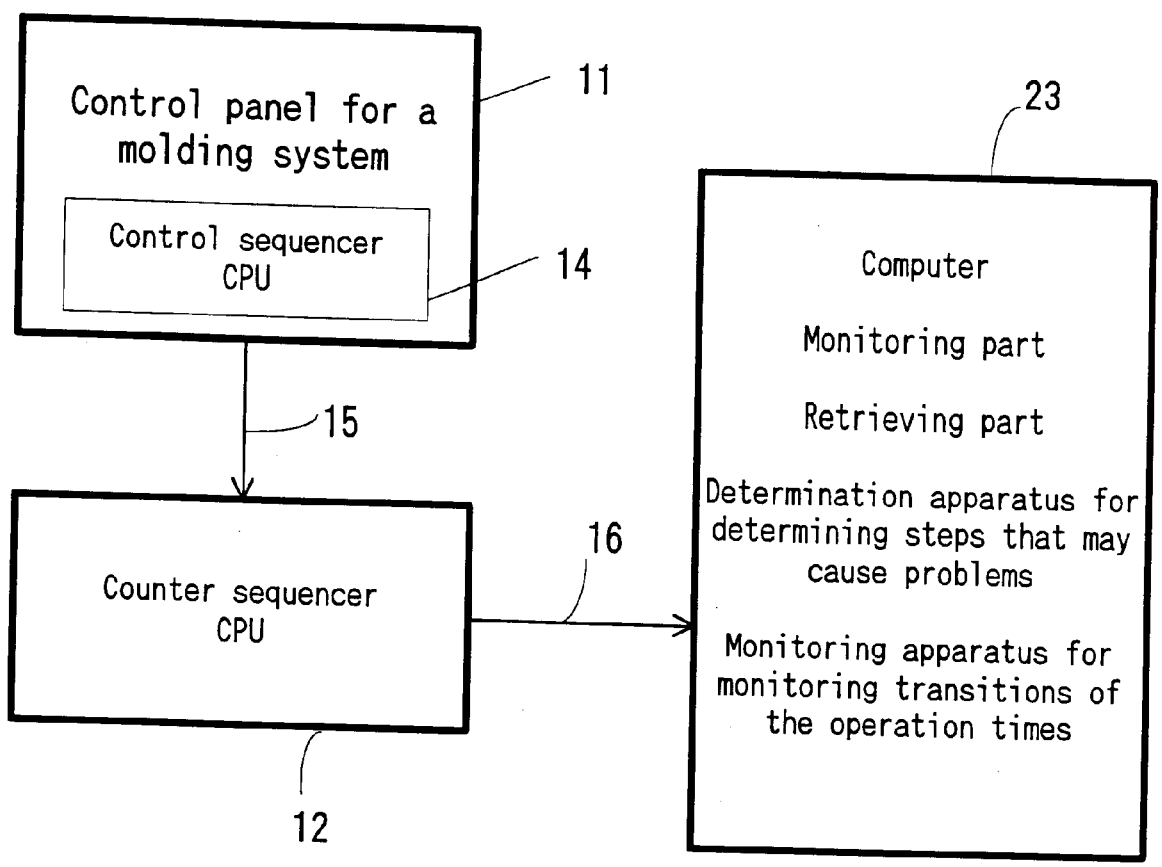
FIG. 15 is a block diagram representing the control system of a second embodiment.

The computer 13 can generate the sum of the times of those operations that exceed a predetermined time and a Pareto diagram that represents the relationships between various components, as in FIG. 11. The computer 13 can generate the sum of the number of times that the operations exceed a predetermined time and a Pareto diagram that represents relationships between various components, as in FIG. 12. Also, the computer 13 generates a frequency table and a histogram of the operation time of each step, as in FIG. 13. The frequency table and histogram allow a step that may have a problem to be determined.

Then the computer 13 works as a monitor part 4 to monitor changes in an operation time, and monitors changes of cycle times of a plurality of operation times of a step that may cause a problem. That is, the computer 13 generates a distribution table that represents relationships between possible problem steps and the cycle times when those steps are performed. Then the computer 13 checks the table. As a result, if a plurality of the operation times of the steps become long, it can be determined that the components of those steps must be soon repaired.

Figure 16:
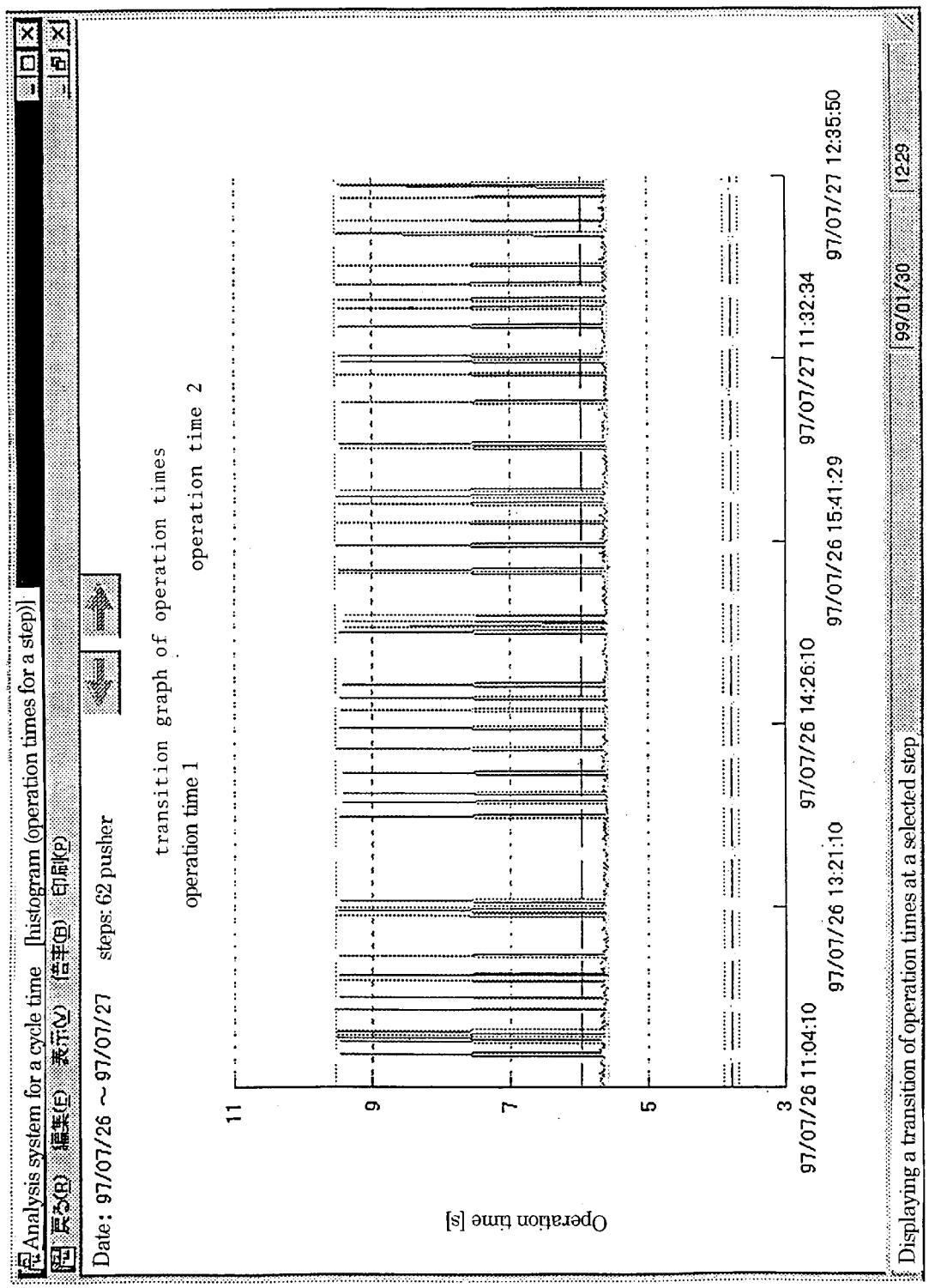
FIG. 16 shows a bar graph that represents the transitions of an operation time for each step that is selected and may case a problem.

The computer 13 can have a monitor part 4 which monitors the transitions, instead of the monitor part 4, which checks changes of the operation times. That is, as in FIG. 15, the computer 23 functions as the problem-solving, part that has the memory part 1, the retrieving part 2, the determination part 3, which determines steps that have problems, and the monitor part 4, which monitors the transitions. Those parts allow components that need to be inspected and repaired to be anticipated. That is, the computer 23 checks the steps that are determined and that may cause a problem. Then, the computer 23 checks the transitions in the changes of a plurality of operation times of a step that is selected. FIG. 16 shows a bar graph that represents the transitions of an operation time for each step that is selected and may cause a problem. The computer 13 can generate it. As a result of that check, if the plurality of those operation times become long, it can be recognized that the components having the operation times must be soon repaired.

Therefore, in accordance with the present invention, a method is provided for determining or anticipating which apparatuses of a molding system must be maintained before such apparatuses reach a state where their operation causes actual interruption of the operation of the molding system. In this method, cycle times are measured and stored that correspond to each cycle of operation of the molding system. Also measured and stored are the operation times of the steps performed by the apparatuses during each cycle of operation of the molding system, where the operation times that are measured are for those steps that have an effect on the cycle times. Data on the cycle times are evaluated to identify any cycle time that is longer than a normal cycle time. When such a cycle time is identified, the method examines the operation times of those steps performed by the apparatuses which affect the cycle time for the identified cycle of operation of the molding system. For each of those steps, the examination is based on the sum of the operation times that exceed a predetermined time, or on the sum of the number of operation times that exceed the predetermined time. Once the steps which may cause a problem are identified, the apparatuses associated with those steps can be checked. This method allows an operator to determine a step of the molding system operation that may cause a problem, so that any apparatuses or components that must be repaired can be early, easily, and certainly determined and anticipated, before the molding system operation must be stopped because of a malfunction.

In a further embodiment of the method of the present invention, once steps which may cause a problem are identified, the method monitors changes in the operation times of the identified steps. As changes in the operation times increase, the apparatuses associated with the monitored steps can be checked. The monitoring of operation time changes of this method allows an operator to find a step that has operation times that become long over time, so that associated components that must be repaired can be early, easily, and certainly determined and anticipated, before the system is caused to stop.

In another embodiment of the method of the present invention, the method further monitors transitions of operation times of the identified steps in order to anticipate apparatuses which must be maintained before the operation of a molding system is caused to be interrupted. That is once a step is identified which may cause a problem, the transitions of operation times for the identified step are monitored. Changes in the transitions of operation times of the identified steps can indicate that the apparatuses associated with such steps should be checked. This embodiment of the method of the present invention therefore allows an operator to determine a step that may cause a problem, so that associated components that must be repaired can be early, easily, and with more certainty determined and anticipated, before the system is caused to stop.

In view of the foregoing, it is to be understood that the maintenance system in accordance with the present invention is operable to determine or anticipate which apparatuses in a molding system must be maintained before the molding system is interrupted by a problem in that apparatus. One embodiment of the maintenance system includes a memory part, a retrieving part, and a determining part. The measuring part measures and stores cycle times for each operation of the molding system, and also measures and stores operation times of steps performed by the apparatuses during the molding system operation. The operation times measured are those that affect the cycle times. The memory part stores the measured cycle times and the measured operation times in a database. The retrieving part retrieves cycle time data from the database and specifies any of the retrieved cycle times that is longer than a normal cycle time. The determining part determines from among the steps performed by the apparatuses that affect the specified retrieved cycle time, any step that may cause a problem that might lead to interruption of the operation of the molding system. This determination is made by examining the stored operation times for the determined step, and is based on the sum of the operation times that exceed a predetermined time, or the sum of the number of operation times that exceed the predetermined time. This embodiment of the maintenance system of the present invention allows an operator to determine which step may cause a problem, so that that associated components or apparatuses that must be repaired can be early, easily, and certainly determined and anticipated, before the system is caused to stop.

Another embodiment of the maintenance system of the present invention further includes a monitoring part. The monitoring part checks changes in the operation times of the determined step. Using a monitoring part to check changes in the operation times allows an operator to determine which step may cause a problem, so that the associated components that must be repaired can be early, easily, and certainly determined and anticipated, before the system is caused to stop.

In a further embodiment of the maintenance system of the present invention, the monitoring part checks the transistors of the operation times of the determined step, instead of merely checking for changes in operation times. This embodiment of the maintenance system also allows an operator to determine which step may cause a problem, so that those associated components that must be repaired can be early, easily, and certainly determined and anticipated, before the system is caused to stop.

What is claimed is:

1. A method for supporting maintenance for a molding system in which apparatuses perform operational steps during operation cycles of the molding systems and for determining or anticipating which of the apparatuses must be maintained before operation of the molding system is caused to be interrupted by an apparatus malfunction, including the steps of measuring, at short intervals, cycle times that correspond to a time for completion of each operation cycle of the molding system, and operation times of the operational steps performed by the apparatuses, wherein the operation times measured are those affecting each cycle time, and storing data on the measured cycle times and the measured operation times in a database, retrieving from the database data on the measured cycle times and specifying any measured cycle time that is longer than a normal cycle time, and determining which operational step, among the operational steps performed by the apparatuses that affect the specified measured cycle time, may cause an interruption of the operation of the molding system, based on a sum of ones of the measured operation times for each operational step that exceed a predetermined time, or a sum of the number of measured operation times for each operational step that exceed the predetermined time.

2. A method for supporting maintenance for a molding system in which apparatuses perform operational steps during operation cycles of the molding system and for determining which of the apparatuses must be maintained before operation of the molding system is caused to be interrupted by an apparatus malfunction, including the steps of measuring, at short intervals, cycle times that each correspond to a time for completion of each operation cycle of the molding system, and operation times of the steps performed by the apparatuses, wherein the operation times measured are those affecting the cycle times, and storing data on the measured cycle times and the measured operation times in a database, retrieving data on the measured cycle times from the database and specifying any measured cycle time that is longer than a normal cycle time, determining which operational step, among the operational steps performed by the apparatuses that affect cycle times, may cause an interruption of the operation of the molding system, based on a sum of ones of the measured operation times for each operational step that exceed a predetermined time, or a sum of the number of measured operation times for each operational step that exceed the predetermined time, and monitoring changes between subsequently measured operation times of the determined operational step.

3. A method for supporting maintenance for a molding system in which apparatuses perform operational steps during operation cycles of the molding system and for anticipating which of the apparatuses must be maintained before operation of the molding system is caused to be interrupted by an apparatus malfunction, including the steps of measuring, at short intervals, data on cycle times each corresponding to a time for completion of each operation cycle of the molding system, and operation times of operational steps performed by the apparatuses, wherein the operation times measured are those affecting the cycle times, and storing data on the measured cycle times and the measured operation times in a database, retrieving measured cycle times from the database and specifying any measured cycle time that is longer than a normal cycle time, determining which operational step, among the operational steps of the apparatuses that affect cycle times, may cause an interruption of the molding system, based on a sum of ones of the measured operation times for each operational step that exceed a predetermined time, or a sum of the number of measured operation times for each operational step that exceed the predetermined time, and monitoring transitions of subsequently measured operation times of the determined operational step.

4. A method for supporting maintenance of a molding system of the type in which a plurality of apparatuses are operative during operation cycles of the molding system, and wherein the plurality of apparatuses perform operational steps during the operation cycles, the method including the steps of determining or anticipating which of the plurality of apparatuses must be maintained before operation of the apparatuses degrade to a condition where operation of the molding system is interrupted, comprising the steps of:

measuring, at short intervals, cycle times of the operation cycles of the molding system and operation times of the apparatuses, wherein each measured cycle time corresponds to a time for completion of one of the operation cycles of the molding system, and each measured operation time corresponds to a time for completion of one of the operation steps performed by the apparatuses and which operational step is capable of affecting the measured cycle times;

storing the measured cycle times and the measured operation times so that a plurality of measured cycle times are stored, and so that for each of the operational steps a plurality of measured operation times are stored;

identifying any measured cycle time that is longer than a normal cycle time for the corresponding operation cycle; and evaluation for each optional step performed during and capable of affecting the operation cycle corresponding to the identified measured cycle time, a sum of corresponding measured operation times that exceed a predetermined time, or a sum of the number of the corresponding operation times that exceed the predetermined time, to identify which operational step and associated apparatuses may cause an interruption of the molding system, wherein the corresponding measured operation times are obtained during a plurality of repetitions of the operation cycles.

5. The method of claim 4, further including the step of:

monitoring changes in the operation times of the identified operational step for changes which exceed predetermined criteria to identify apparatuses which should be repaired.

6. The method of claim 4, further including the step of:

monitoring transitions between the operation times of the identified operational step, for changes which exceed predetermined criteria, to identify apparatuses which should be repaired.

* * * * *